Aug. 30, 1938.　　　F. HEJDUK ET AL　　　2,128,413
VARIABLE RATIO GEARING
Filed Nov. 27, 1935　　　2 Sheets-Sheet 1

INVENTOR.
František Hejduk and
Jan Neumann
BY Ben J. Chromy
ATTORNEYS.

Aug. 30, 1938.  F. HEJDUK ET AL  2,128,413

VARIABLE RATIO GEARING

Filed Nov. 27, 1935  2 Sheets-Sheet 2

INVENTORS
Frantisek Hejduk
and
BY Jan Neumann
ATTORNEYS.

Patented Aug. 30, 1938

2,128,413

UNITED STATES PATENT OFFICE 2,128,413

VARIABLE RATIO GEARING

František Hejduk and Jan Neumann, Prague, Czechoslovakia

Application November 27, 1935, Serial No. 51,936
In Czechoslovakia April 17, 1935

1 Claim. (Cl. 74—394)

The object of the invention is to provide a drive in which the gear ratio can be changed within definite limits with a high degree of accuracy of gear ratio.

For continuously variable ratio it is usual to employ V-pulleys and belts, friction wheels, or other parts by which the power and movement is transmitted by friction between the different parts. With such a transmission there is always a certain amount of slip between the transmission parts, and therefore there is a steady change in velocity or inaccuracy in the transmission ratio. Such drives are therefore unsuitable for various purposes such as for example for driving measuring devices in which it is important to maintain an exact gear ratio between the actual measuring device, which measures a certain physical magnitude (e. g. amount or volume) and its counting mechanism, which registers the volume measured. It is possible, of course, with a constant gear ratio drive, to adjust the measuring device to ensure agreement between the amount measured and that registered, but this method of adjustment is undesirable for the measurement of some physical magnitudes, e. g. for the measurement of amounts of fluids, especially when the measurement has to be carried out on a fluid subjected to varying temperature or under a varying air pressure or the like.

Since in drives requiring a continuous variation in gear ratio it is not possible to avoid a friction drive, which always causes an inaccuracy in transmission, according to the present invention the friction transmission is only used for a small portion of the total transmission, the remainder of the transmission being carried out by a drive which works at constant velocity. In addition, in one construction of drive according to the invention only two frictional driving parts are employed as part of the transmission gear and these two driving parts are not continuously rotatable, but consist of friction couplings driving in one direction only, that is frictional pawl devices or free-wheel connections.

The drive according to the invention is shown on the accompanying drawings, by way of example as part of counting mechanism for any desired measuring apparatus.

Figure 1:
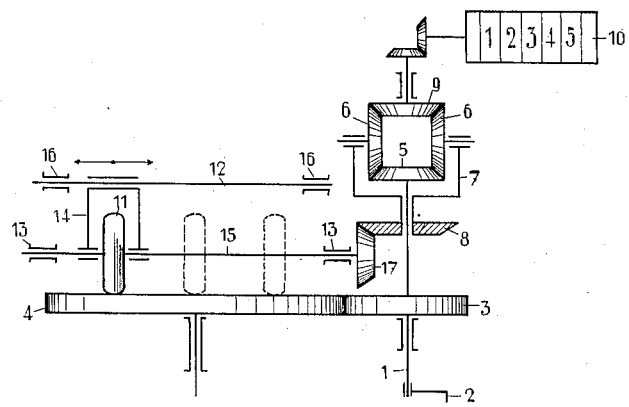
Figure 4:
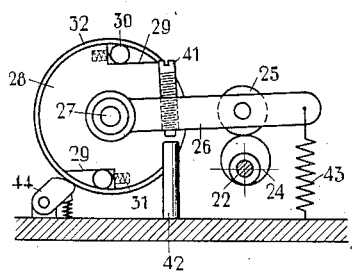
Figure 5:
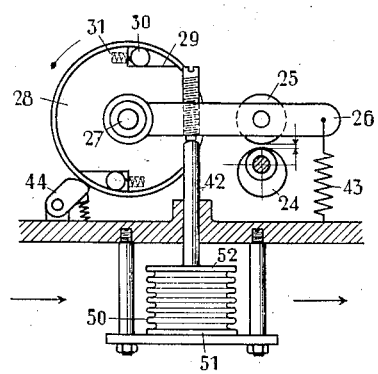
Figure 2:
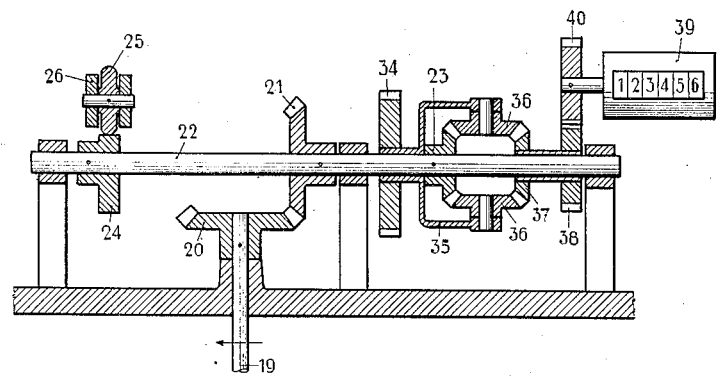
Figure 3:
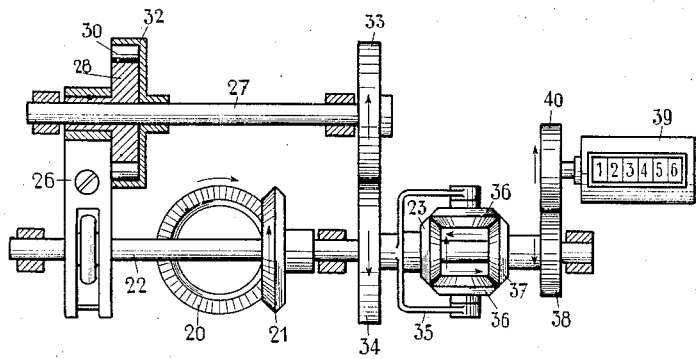

Fig. 1 is a schematic showing of the apparatus of this invention; Fig. 2 is a vertical sectional view of an embodiment of this invention; Fig. 3 is a top plan view of the apparatus shown in Fig. 2; Fig. 4 is a side elevation view of the auxiliary gear adjusting mechanism; Fig. 5 shows a section through a drive in which the gear ratio is altered automatically in accordance with changes in temperature or air pressure.

In the arrangement according to Fig. 1, any desired, but not shown, measuring device rotates the shaft 1 by means of the crank 2. On the shaft 1 there is keyed the spur wheel 3, which meshes with the wheel 4, and also the bevel wheel 5 which forms a differential gear with the other three gear wheels 6, 6, 9. The spindles of the two wheels 6, 6, can rotate in bearings in the cage 7 which can itself rotate round the shaft 1. The bevel wheel 8 is fixed to the cage 7. The movement of the bevel wheel 9 is transmitted to a counting mechanism 10. The friction wheel 11 can be moved across the face of the gear wheel 4 by means of a fork 14 slidable along the shaft 12 carried in bearings 16. The wheel 11 is moved along its splined or square-section shaft 15, which is rotatable in the bearings 13. Thus the wheel 11 can run at a different distance right or left of the central axis of the wheel 4, or can lie directly above this axis. The rotational movement of the wheel 11 is transmitted by means of the shaft 15 through the bevel wheel 17 to the bevel wheel 8 and from this to the cage 7 of the differential gear.

By the sliding movement of the wheel 11 its velocity of rotation and also its direction of rotation can be altered. When the wheel 11 is in the central position, shown by broken lines, over the centre of the wheel 4, then it is at rest and thus the cage 7 connected with the wheel 8 does not rotate. The rotation of the shaft 1 is thus transmitted from gear wheel 5 through wheels 6 to gear wheel 9 without any variation in speed. If the wheel 11 is not in the central position then it rotates with a circumferential velocity which varies according to the distance of the wheel from the central point of the gear wheel 4. This rotational movement of the wheel 11 is transmitted by means of the pair of wheels 17—8 to the cage 7, and by means of the differential gear it adds to or subtracts from the original rotational movement of the shaft 1, so that the wheel 9 then rotates at a higher or lower speed than the shaft 1.

The advantage of this arrangement lies in the fact that any inaccurate transmission of the movement through the friction wheel plays only a small part in the final movement of the counter, this part, however, being necessary for regulation. At the same time the movement of the other parts of the transmission mechanism (the gear wheels) remains constant, so that after the regulation of these gear ratios by means of the differential gear there can only be unimportant inaccuracies in the gear ratio, which are in practice of no significance.

An example of another constructional arrangement is shown in Figs. 2 to 4. With this arrangement the drive by a friction wheel is eliminated, friction pawl arrangements or free-wheel devices being employed instead. The rotational movement of the measuring device is transmitted to the shaft 19 and then by means of the bevel wheels 20 and 21 to the shaft 22 on which are keyed the bevel wheel 23 and the cam 24 (see also Fig. 4). On this cam presses the roller 25 carried in the forked lever 26 which is pivoted on the shaft 27. The lever 26 is combined with a disc 28, also rotatable round the shaft 27, and provided with two or more recesses 29 in its edge in which there are rollers 30 pressed outwardly by springs 31, 32. The disc 28 together with the rollers 30 is arranged inside the rim of a casing 32 which is keyed on the shaft 27. The movement of the shaft 27 is transmitted through the gear wheel 33 to the wheel 34 which is freely rotatable on the shaft 22 and is combined with the carrier 35 in which are pivoted the bevel wheels 36 which rotate with the carrier 35 round the center wheel 37 which is freely rotatable on the shaft 22 and is fixed to the gear wheel 38. The latter drives a counting mechanism 39 through the gear wheel 40. The lever 26, which is drawn downwards by the spring 43, is provided with an adjusting screw 41 which bears against the pin 42 (Fig. 4) when the lever 26 is allowed to move downward. In order to prevent the casing 32 from turning back, it is held by the spring-loaded friction pawl 44.

The operation is that the movement of the driving shaft 19 is transmitted directly to the counting mechanism 39 through the wheels 20, 21 and the wheels 23, 36, 37, 38, 40, and to this movement there is added a second movement of variable and adjustable magnitude. This second movement is brought about by the oscillation of the lever 26, the stroke of the lever being altered and limited by the adjusting screw 41. On the upward movement of the free end of the lever the disc 28 also turns, carrying with it, through the action of the rollers 30, the casing 32 which rotates the shaft 27. The rotational movement of this shaft is transmitted through the pair of wheels 33, 34 to the differential gear 23, 36, 37, and is added on to the main movement. Owing to the action of the pawl arrangement or free-wheel formed by disc 28, rollers 30 and casing 32, when the lever 2 makes a downward movement it only takes the disc 28 with it, the connection with the casing 39 is freed and the pawl 44 prevents the latter from turning back. The direction of rotation of the individual wheels is shown in Fig. 3.

The need for such an automatic variation in gear ratio occurs, for example, in the drive to the counting mechanism of flow meters in which it is desired to eliminate the effect of temperature on the volume measured. In order that the counting mechanism may show a constant amount of flow at different temperatures, the change-speed gear for the counting mechanism must be automatically regulated by means of a thermostat. An example of this is shown in Fig. 5, which is a section through the transmission gear of Figs. 2 to 4 with the necessary parts added thereto. The pin 42', which replaces the fixed pin 42 of Fig. 4, is connected with the thermostat, which in this case is in the form of a hollow cylinder, having solid end pieces connected by a corrugated sheet metal casing, flexible in an axial direction, and filled with liquid. The lower end piece 51 is fixed, while the upper one 52 has attached to it the pin 42'. A similar device can also be used to balance out the effect of changes of air pressure and like changes influencing the results of the measurement.

The adjustable stop 42' may if desired be fitted with a visible indicator showing the net gear ratio.

We claim:

A variable ratio transmission for use in driving counting devices in stream flow meters for liquids, comprising two transmissions, a differential drive for connecting said transmissions, the principal one of said transmissions being of constant ratio and carrying out the larger part of the resultant motion, and the auxiliary one of said transmissions being changeable and carrying out the smaller part of the motion of said transmission by a value such that the overall ratio of said transmission is varied to a predetermined extent, said auxiliary transmission comprising a lever, a cam for imparting a swinging motion to said lever, a self-restraining friction coupling directly connected to said lever for adding the movements of said lever, means for connecting said coupling to said differential drive for transmitting motion of said lever to said differential drive, means for limiting the back movement of said lever and means for coupling an indicating device to said differential drive.

FRANTIŠEK HEJDUK.
JAN NEUMANN.